A. G. TAYLOR.
ELECTRIC CURRENT COLLECTOR.
APPLICATION FILED MAY 24, 1916.
1,211,006.
Patented Jan. 2, 1917.
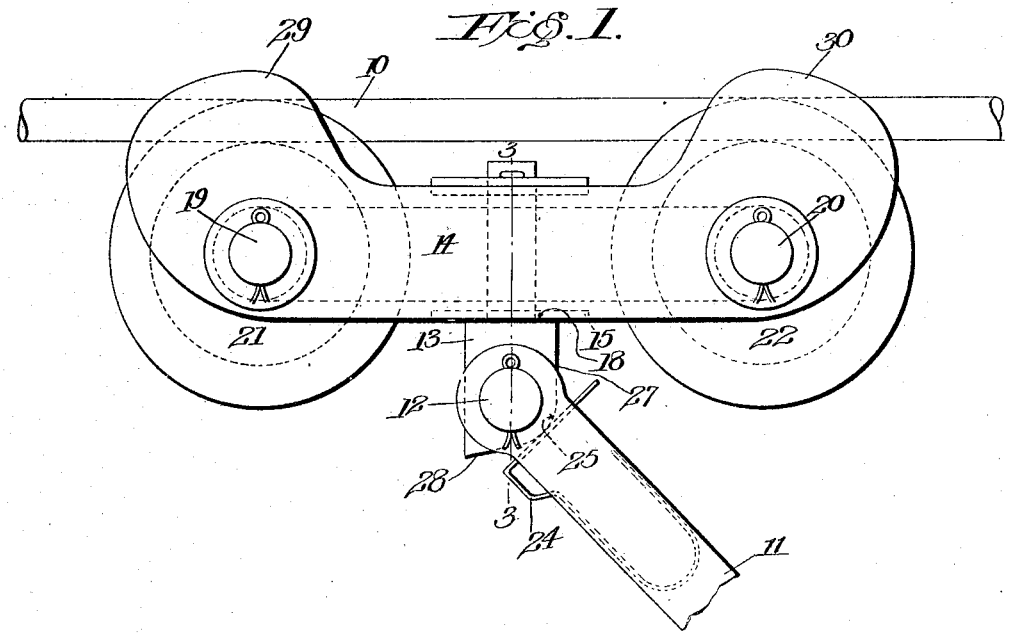
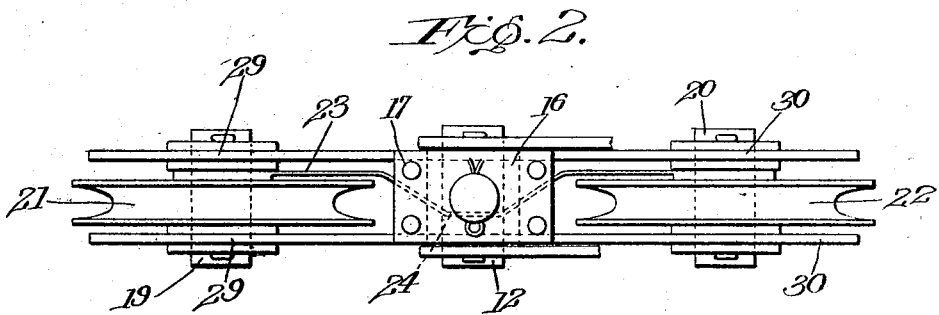
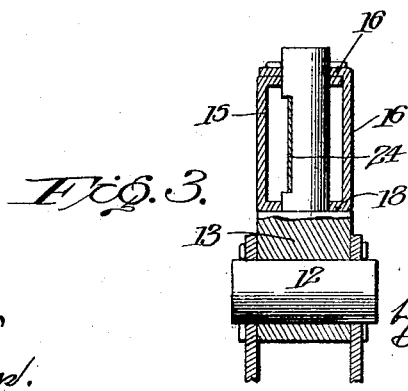

UNITED STATES PATENT OFFICE.

ALFRED G. TAYLOR, OF GREENVILLE, SOUTH CAROLINA, ASSIGNOR TO JAMES R. AIKEN, OF GREENVILLE, SOUTH CAROLINA.

ELECTRIC-CURRENT COLLECTOR.

1,211,006.      Specification of Letters Patent.      Patented Jan. 2, 1917.

Application filed May 24, 1916. Serial No. 99,588.

*To all whom it may concern:*

Be it known that I, ALFRED G. TAYLOR, a citizen of the United States, residing at Greenville, Greenville county, State of South Carolina, have invented certain new and useful Improvements in Electric-Current Collectors, of which the following is a specification.

This invention relates to electric current collecting devices, particularly to devices of this class used in electric traction where a moving contact or collecting device travels along a stationary electrical conductor and conducts current therefrom to a motor, such as the motor of a street car.

It is the object of this invention to provide such a device in which a frame is pivotally secured to a trolley pole, there being a trolley wheel mounted in each end of the frame, both of which, or either one of which, may be adjusted to form the contact between the trolley pole and the stationary conductor.

Another object of my invention is to provide a device of this class in which the maximum current is conducted from the stationary conductor to the trolley pole, by reducing the resistance within the collector itself to the minimum.

Other objects are to provide a device of this character which is easily replaced in contact with the stationary conductor, whenever displaced therefrom, and which is strong, simple to manufacture, and which may be placed upon the usual trolley pole now in use with slight difficulty.

My invention will be fully disclosed in the following description taken in connection with the accompanying drawings in which, Figure 1 is a side view of my invention in contact with a trolley wire; Fig. 2 is a top view of the same, the trolley wire being omitted; Fig. 3 is a section along the line 3—3 of Fig. 1.

The stationary conductor may be a rail or wire, as desired, but as devices of this class are more frequently used in connection with trolley wires I have shown in the drawings a trolley wire, indicated by 10, and have shown the rolling contact wheels as being grooved to receive such wire. The trolley pole is indicated by 11 and has the usual harp shaped upper end provided with an axle 12, which is suitable for supporting the usual single trolley wheel, not shown. Mounted upon the axle 12 and rotatable relatively thereto is a stem 13 having a square base or lower portion and a round upper portion.

The stem 13 passes through suitable holes in the bottom and top of a sheet metal frame 14 and a cotter pin passing through the top of the stem prevents the accidental displacement of the frame therefrom. The frame is of one piece and comprises two parallel side portions connected by short webs 15 and 16, the lower web 15 being integral with the side portions and the upper web 16 being formed of two overlapping portions, one integral with each side and suitably secured together by rivets 17. The frame is held between the cotter pin and the shoulder 18 of the stem and, the upper portion of the stem being round, the frame is rotatable thereon as an axis.

Mounted in the opposite ends of the frame at points equidistant from the central stem are axles 19 and 20 and upon these axles are journaled trolley wheels 21 and 22, which are prevented from coming in contact with the sides of the frame by suitable washers. A flat spring 23 is also mounted upon and extends between the axles, which spring has an offset milled portion 24 extending around the central stem 13. The spring is so shaped that, when in this position its ends press constantly against the hubs of the trolley wheel in one direction and its offset middle portion 24 has a constant pressure against the side of the stem in the other direction.

The side of the stem 13 against which the spring bears is made flat, the plane of the flat face being parallel to the plane including the pole and wire and the frame 14, being rotatable about the stem 13, is normally held by the spring with its longitudinal axis parallel to the plane of the flat side of the stem and hence parallel to the plane of the pole and conductor. It can thus be seen that the spring 23 constantly tends to keep the stationary conductor, the trolley pole, and the wheels in substantially a fixed plane and if, for any reason, the frame is swung out of this plane, tends to return it thereto.

Another and very important function of the spring is to provide a constant contact between the wheels and the stem so that the current collected by the wheels may pass directly therefrom into the stem without passing through the frame. The advantage of this is apparent, as the current will not have to pass between the axle and the frame and the frame and the stem in passing from the wheels to the pole, but will pass directly from the wheel into the stem and thence into the pole, thus avoiding two places where, due to dirt and oil, material resistance may be met.

The bottom of the stem 13 is made substantially square, but one corner thereof, indicated by 25 in Fig. 1, is rounded, and against this rounded portion the flat portion of a leaf spring 26 bears, which spring is fastened within the harp shaped upper end of the pole. This spring also has a double function as it not only tends to retard the rotation of the frame around the axle 12 when the wheels are free from the wire but also to serve as a contact between the stem and the pole, thereby short circuiting the journals of the axle 12, which may offer resistance to the passage of the current.

The flat sides 27 and 28 of the stem 13 are so arranged that when the frame is rotated on the axle 12 to the right, Fig. 1, the spring 26 will hold it in this position, the frame being substantially parallel to the pole, and the wheel 21 alone will engage the wire 10. By rotating the frame 14 toward the left, Fig. 1, the flat side 28 will engage the spring 26 and be held thereby in this position, the wheel 22 then alone engaging the wire. It is often desirable to make this adjustment, especially when the trolley is forced to travel around sharp curves. In order that the liability to "jump" the trolley be reduced to the minimum, I have shown the sides of the frame produced upwardly to form guards 29, 29 and 30, 30 on both sides of the conductor.

From the foregoing description the advantages of my invention will be apparent. A greater amount of current may be obtained from the stationary conductor than can now be generally obtained therefrom by devices of this class. The two rolling contacts or wheels being pressed with equal force against the wire, wear is equally distributed, and there is little tendency on the part of the trolley to become disengaged from the conductor. The self alining feature of the device enables the collector to be quickly replaced in contact with the stationary conductor whenever it becomes accidentally displaced therefrom.

In times of ice and sleet, there will be a considerable advantage with the two wheels. An ordinary ice wheel can be used in the front end and this will break the ice on the wire and cause it to fall off so that the regular smooth wheel following may have a good contact with the wire. Even if an ice wheel is not used on the front end, the additional wheel is of advantage since an ordinary trolley wheel will clean the wire except in a very hard freeze.

Having thus described the invention, what is claimed and desired to be secured by Letters Patent is:

1. In a current collecting device, the combination with a frame, of a support on which said frame is adjustable, and a wheel mounted in each end of said frame and adapted to roll in contact with a conductor to collect current therefrom, and means for maintaining said frame in any one of three different positions on its support to hold either wheel or both wheels in contact with a current conductor.

2. In a current collecting device, a trolley pole, a stem pivotally mounted on said pole, a frame secured to said stem, a trolley wheel mounted in said frame, a spring within the frame having vertical faces bearing against said wheel and said stem, and a second spring bearing against said stem and said pole, said springs being adapted to facilitate the conduction of electricity from said wheel to said pole.

3. In a current collecting device, a trolley pole, a frame, a stem pivoted to said pole and carrying said frame, said stem and frame being rotatable about said pivot in a vertical plane, a trolley wheel mounted in each end of said frame, and a spring secured to said pole and adapted to frictionally engage said stem below its pivot to retard the rotation of said frame about said pivot.

4. In a current collecting device, a trolley pole, a frame, connecting means between said pole and said frame allowing said frame to rotate about an axis at right angles to said pole and to rotate about a second axis at right angles to said first axis, spring means for retarding frictionally the rotation of said frame about said first axis, and spring means normally tending to hold said frame in a plane at right angles to said first mentioned axis.

5. In a current collecting device, a trolley pole, a frame, a member pivotally connecting said frame and said pole, a trolley wheel mounted in each end of said frame, and a spring within said frame having vertical faces continuously contacting with each of said wheels and also having a bend provided with a vertical face continuously contacting with a vertical side of said member, said spring being adapted to facilitate the conduction of electricity from said wheels to said member.

6. In a current collecting device, a trolley pole, a stem having a flat longitudinal face pivoted to said trolley pole and rotatable in a plane, a frame rotatably mounted on said stem, a trolley wheel mounted in each end of said frame, a spring pressing against each of said wheels in one direction and against the flat side of said stem in the other direction, thereby facilitating the conduction of electricity from the trolley wheels to the stem and also tending to keep the longitudinal axis of the frame parallel with the plane of the flat side of the stem.

7. In a current collecting device, the combination with a trolley pole, of a stem pivoted to said pole and swingable about a vertical plane, a frame having sides connected together at the bottom by a web provided with an opening therein to receive said stem, said stem projecting through said opening and mounting said frame to swing around the axis of said stem, a wheel mounted on said frame, and a spring above said web cooperating with said stem and wheel to resist the movement of the frame about the axis of the stem and also serving as a conductor electrically connecting said wheel and stem.

8. In a current collecting device, the combination with a trolley pole, of a stem pivoted to said pole and swingable in a vertical plane, a frame having upper and lower webs provided with openings to receive said stem whereby the frame is swingable about an upwardly extending axis, a wheel mounted in each end of the frame, and a spring engaging said wheels and also engaging said stem between said webs to resist the movement of the frame about its upwardly extending axis.

9. In a current collecting device, the combination with a one-piece frame comprising sides connected intermediate their ends by top and bottom webs having openings therein, a wheel mounted in the ends of the frame and on opposite sides of said webs, and a frame-supporting member having a stem extending through the openings in said webs to provide a pivotal support for said frame.

10. In a current collecting device, the combination with a frame, of a wheel mounted in each end of said frame, a trolley pole, a stem carrying said frame and pivoted on said pole, said stem having a rounded portion thereon below its pivot and flat portions on opposite sides of said rounded portion, and a spring mounted on said pole and having a flat part adapted to frictionally engage any one of said portions of the stem to hold it and the frame thereon in any one of three adjusted positions.

In testimony whereof I affix my signature.
ALFRED G. TAYLOR.

Copies of this patent may be obtained for five cents each, by addressing the "Commissioner of Patents, Washington, D. C."